United States Patent
Peng et al.

(10) Patent No.: US 12,015,551 B2
(45) Date of Patent: Jun. 18, 2024

(54) PACKET ENCAPSULATION METHOD, PACKET FORWARDING METHOD, ANNOUNCEMENT METHOD, ELECTRONIC DEVICE, AND STORAGE MEDIUM

(71) Applicant: ZTE CORPORATION, Guangdong (CN)

(72) Inventors: Shaofu Peng, Guangdong (CN); Aihua Liu, Guangdong (CN); Jun Feng, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/910,451

(22) PCT Filed: Dec. 21, 2020

(86) PCT No.: PCT/CN2020/138124
§ 371 (c)(1),
(2) Date: Sep. 9, 2022

(87) PCT Pub. No.: WO2021/179732
PCT Pub. Date: Sep. 16, 2021

(65) Prior Publication Data
US 2023/0126801 A1    Apr. 27, 2023

(30) Foreign Application Priority Data
Mar. 10, 2020    (CN) .......................... 202010163666.4

(51) Int. Cl.
*H04L 45/122* (2022.01)
*H04L 45/00* (2022.01)
*H04L 45/17* (2022.01)

(52) U.S. Cl.
CPC .......... *H04L 45/566* (2013.01); *H04L 45/122* (2013.01); *H04L 45/17* (2022.05); *H04L 45/34* (2013.01)

(58) Field of Classification Search
CPC ..... H04L 45/122; H04L 45/17; H04L 45/566; H04L 45/34; H04L 45/50; H04L 45/74; H04L 45/12
See application file for complete search history.

(56) References Cited

U.S. PATENT DOCUMENTS

| 9,660,897 B1 | 5/2017 | Gredler |
| 10,419,333 B2 | 9/2019 | Lin et al. |

(Continued)

FOREIGN PATENT DOCUMENTS

| CN | 105471737 A | 4/2016 |
| CN | 108512758 A | 9/2018 |

(Continued)

OTHER PUBLICATIONS

Mota, Ray, Segment Routing, Aug. 30, 2018, LinkedIN, Retrieved from Aug. 18, 2023: <https://www.linkedin.com/pulse/segment-routing-ray-mota-phd> p. 1-23 (Year: 2018).*
WIPO, International Search Report dated Jan. 25, 2021.
S. Previdi, et al. "IPv6 Segment Routing Header (SRH)", Oct. 2, 2015.

*Primary Examiner* — Tonia L Dollinger
*Assistant Examiner* — Joseph M Cousins
(74) *Attorney, Agent, or Firm* — Li & Cai Intellectual Property (USA) Office (57) ABSTRACT

The present disclosure provides a packet encapsulation method, including: determining a segment routing-traffic engineering (SR-TE) path; generating, according to a segment identifier (SID) of each node in the SR-TE path, an SID list, where each node supports a plurality of unified-SID encapsulation types (UETs) corresponding to SIDs of different lengths, and in the SID list, the SID of at least a node (Continued)

serving as an intermediate node of the SR-TE path is the SID having the non-longest length in the plurality of SIDs corresponding to the node; forming a segment routing header (SRH) from the SID list; and encapsulating an initial packet with the SRH to obtain a final packet. The present disclosure further provides a packet forwarding method, a UET announcement method, an electronic device, and a computer-readable storage medium. The final packet obtained by the packet encapsulation method has a higher load rate.

10 Claims, 5 Drawing Sheets

(56) References Cited

U.S. PATENT DOCUMENTS

| | | | |
|---|---|---|---|
| 11,362,940 B2 | 6/2022 | Peng et al. | |
| 2018/0034727 A1* | 2/2018 | Nainar | H04L 45/74 |
| 2020/0153732 A1* | 5/2020 | Negi | H04L 45/42 |
| 2020/0403910 A1 | 12/2020 | Hu | |

FOREIGN PATENT DOCUMENTS

| | | | | |
|---|---|---|---|---|
| CN | 109218189 A | 1/2019 | | |
| WO | WO-2019007166 A1 * | 1/2019 | | H04L 12/4633 |
| WO | WO-2021135468 A1 * | 7/2021 | | H04L 12/4633 |

* cited by examiner

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Next Header   |  Hdr Ext Len  | Routing Type  | Segments Left |
+-+-+-+-+-+-+-+-+-+-+-+-+-+-+-+-+-+-+-+-+-+-+-+-+-+-+-+-+-+-+-+-+
|  Last Entry   |     Flags     |UET|            Tag            |
+-+-+-+-+-+-+-+-+-+-+-+-+-+-+-+-+-+-+-+-+-+-+-+-+-+-+-+-+-+-+-+-+
|                       128bits-vpn-sid                         |  : [0] element
+-+-+-+-+-+-+-+-+-+-+-+-+-+-+-+-+-+-+-+-+-+-+-+-+-+-+-+-+-+-+-+-+
|                          0 (32bits)                           |
+-+-+-+-+-+-+-+-+-+-+-+-+-+-+-+-+-+-+-+-+-+-+-+-+-+-+-+-+-+-+-+-+
|                          0 (32bits)                           |
+-+-+-+-+-+-+-+-+-+-+-+-+-+-+-+-+-+-+-+-+-+-+-+-+-+-+-+-+-+-+-+-+  [1] element
|      32bits-label-d       |UET|                               |
+-+-+-+-+-+-+-+-+-+-+-+-+-+-+-+-+-+-+-+-+-+-+-+-+-+-+-+-+-+-+-+-+
|      32bits-label-z       |UET|                               |
+-+-+-+-+-+-+-+-+-+-+-+-+-+-+-+-+-+-+-+-+-+-+-+-+-+-+-+-+-+-+-+-+
|                      128bits-end-sid-abr2                     |  : [2] element
+-+-+-+-+-+-+-+-+-+-+-+-+-+-+-+-+-+-+-+-+-+-+-+-+-+-+-+-+-+-+-+-+
|                       128bits-end-sid-y                       |  : [3] element
+-+-+-+-+-+-+-+-+-+-+-+-+-+-+-+-+-+-+-+-+-+-+-+-+-+-+-+-+-+-+-+-+
|                          0 (32bits)                           |
+-+-+-+-+-+-+-+-+-+-+-+-+-+-+-+-+-+-+-+-+-+-+-+-+-+-+-+-+-+-+-+-+
|                          0 (32bits)                           |
+-+-+-+-+-+-+-+-+-+-+-+-+-+-+-+-+-+-+-+-+-+-+-+-+-+-+-+-+-+-+-+-+  [4] element
|                        32bits-ipv4-abr1                       |
+-+-+-+-+-+-+-+-+-+-+-+-+-+-+-+-+-+-+-+-+-+-+-+-+-+-+-+-+-+-+-+-+
|                         32bits-ipv4-x                         |
+-+-+-+-+-+-+-+-+-+-+-+-+-+-+-+-+-+-+-+-+-+-+-+-+-+-+-+-+-+-+-+-+
//           Optional Type Length Value objects (variable)     //
+-+-+-+-+-+-+-+-+-+-+-+-+-+-+-+-+-+-+-+-+-+-+-+-+-+-+-+-+-+-+-+-+
```

PACKET ENCAPSULATION METHOD, PACKET FORWARDING METHOD, ANNOUNCEMENT METHOD, ELECTRONIC DEVICE, AND STORAGE MEDIUM

CROSS-REFERENCE TO RELATED APPLICATIONS

The present application is based on International Application No. PCT/CN2020/138124, filed on Dec. 21, 2020, which is based upon and claims priority to Chinese Patent Application No. 202010163666.4, filed on Mar. 10, 2020, and the entire contents thereof are incorporated herein by reference.

TECHNICAL FIELD

Embodiments of the present disclosure relate to the field of data communication, and specifically relate to a packet encapsulation method, a packet forwarding method, a UET announcement method, an electronic device, and a computer-readable storage medium.

BACKGROUND

Segment routing (SR) is a method for routing based on a source node. Typically, the source node adds a layer of ordered instruction (also called ordered segment identifier, SID) list information on the outside of the data packet; and in the data plane, the source node forwards the segments one by one via a shortest path according to the ordered SID list information. When the SID list is long, the packet may have a very long segment routing header (SRH), and thus reduces a load rate of the packet.

SUMMARY

Embodiments of the present disclosure provide a packet encapsulation method, a packet forwarding method, a UET announcement method, an electronic device, and a computer-readable storage medium.

In a first aspect, an embodiment of the present disclosure provides a packet encapsulation method, including:
 determining a segment routing-traffic engineering (SR-TE) path;
 generating, according to a segment identifier (SID) of each node in the SR-TE path, an SID list, where each node supports a plurality of unified-SID encapsulation types (UETs) corresponding to SIDs of different lengths, and in the SID list, the SID of at least a node serving as an intermediate node of the SR-TE path is the SID having the non-longest length in the plurality of SIDs corresponding to the node;
 forming a segment routing header (SRH) from the SID list; and
 encapsulating an initial packet with the SRH to obtain a final packet.

In a second aspect, an embodiment of the present disclosure provides a packet forwarding method, including:
 receiving a final packet sent from a previous node, and parsing the final packet to obtain a SID list of nodes in a segment routing-traffic engineering (SR-TE) path, where the final packet is a final packet obtained by the encapsulation method according to claim 1; and
 forwarding the final packet to a next hop node according to the SID list.

In a third aspect, an embodiment of the present disclosure provides a unified-SID encapsulation type (UET) announcement method, including:
 announcing information carrying a UET capability of a current node to a network; and
 announcing SID information carrying the corresponding UET capability of the current node to the network.

In a fourth aspect, an embodiment of the present disclosure provides an electronic device, including:
 one or more processors; and
 a storage device having one or more programs stored thereon which, when executed by the one or more processors, cause the one or more processors to implement any method described above.

In a fifth aspect, an embodiment of the present disclosure provides a computer-readable storage medium having a computer program stored thereon which, when executed by a processor, causes any method described above to be implemented.

According to the packet encapsulation method of the present disclosure, the SID list includes SIDs with non-longest lengths among the plurality of SIDs corresponding to each node, so that the SID list, and thus the finally formed SRH, are relatively short, thereby improving the load rate of the final packet.

BRIEF DESCRIPTION OF DRAWINGS

Accompanying drawings are provided for further understanding of the embodiments of the present disclosure and constitute a part of the specification. Hereinafter, these drawings are intended to explain the present disclosure together with the following embodiments, but should not be considered as a limitation to the present disclosure. The above and other features and advantages will become more apparent to those skilled in the art through detailed description of the exemplary embodiments with reference to the accompanying drawings, in which.

DETAIL DESCRIPTION OF EMBODIMENTS

To improve understanding of the technical solution of the present disclosure for those skilled in the art, the packet encapsulation method, the packet forwarding method, the UET announcement method, the electronic device, and the computer-readable storage medium of the present disclosure will be described below in detail in conjunction with the accompanying drawings.

Example embodiments will be described more sufficiently below with reference to the accompanying drawings, but which may be embodied in different forms and should not be construed as limited to the embodiments set forth herein. Rather, these embodiments are provided so that the present disclosure will be thorough and complete, and will fully convey the scope of the present disclosure to those skilled in the art.

Embodiments of the present disclosure and features of the embodiments may be combined with each other without conflict.

As used in herein, the term "and/or" includes any and all combinations of one or more of the associated listed items.

The terminology used herein is for the purpose of describing specific embodiments only and is not intended to limit the present disclosure. As used herein, the singular forms "a", "an" and "the" are intended to include the plural forms as well, unless the context clearly indicates otherwise. It will be further understood that as used herein, the terms "comprise" and/or "consist of . . . " specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art. It will be further understood that terms, such as those defined in commonly used dictionaries, should be interpreted as having a meaning that is consistent with their meaning in the context of the existing art and the present disclosure, and will not be interpreted in an idealized or overly formal sense unless expressly so defined herein.

In the existing art, segment routing may be applied to a multiprotocol label switching (MPLS) data plane or an IPv6 data plane. When applied to an MPLS data plane, segment routing is referred to as SR-MPLS, and when applied to an IPv6 data plane, segment routing is referred to as SRv6. In one standard, the application of segment routing to an MPLS data plane by superimposing a layer of ordered segment list (also known as an MPLS label stack) external to the packet is described. In another standard, the application of segment routing to an IPv6 data plane by superimposing a layer of ordered segment list (i.e., a string of IPv6 address list) external to the packet is described. It can be seen that, when the instruction list is long, both of the above two methods will result in an excessively long packet header, seriously reducing the load rate of the packet. Especially for SRv6, when SRH is introduced into the packet header, a string of mandatory IPv6 address list is included, which greatly limits implementation of the specific product.

A core idea of the present disclosure is to introduce into the SRH a shorter SID, such as 64-bit, or 32-bit, or 16-bit, or 8-bit SID, or the like, which are collectively called compressed SID, to replace the existing classical 128-bit SRv6 SID. Compared with the existing 128-bit SID, a 32-bit SID has a compression effect that is improved by 4 times, is more adapted to the mainstream chip processing capability in the current industry, and is also very convenient for protocol extension of the corresponding control plane. Therefore, the present disclosure suggests using a short SID of 32 bits and is mainly discussed on this basis, but the discussed solution is also suitable for SIDs of other lengths.

Another core idea of the present disclosure is to support a mixture of SIDs of different lengths, that is, the SRH contains multiple SIDs of different lengths at the same time to adapt to the implementation of network upgrade step by step. For example, in the SID list, some of the SIDs are classical 128-bit SRv6 SIDs, some of the SIDs are 32-bit compressed SIDs, and some of the SIDs are 16-bit compressed SIDs. In order to achieve this flexible mixing effect, an explicit prompt for changes in the SID length is desired on a boundary node where the SID length changes. To this end, the following will discuss how to extend the control plane protocol, so that when the SID list is constructed end-to-end, the boundary node where the SID length changes is determined in the segment list, and responsible for decapsulating the SRH to switch from one SID length to another SID length.

Figure 1:
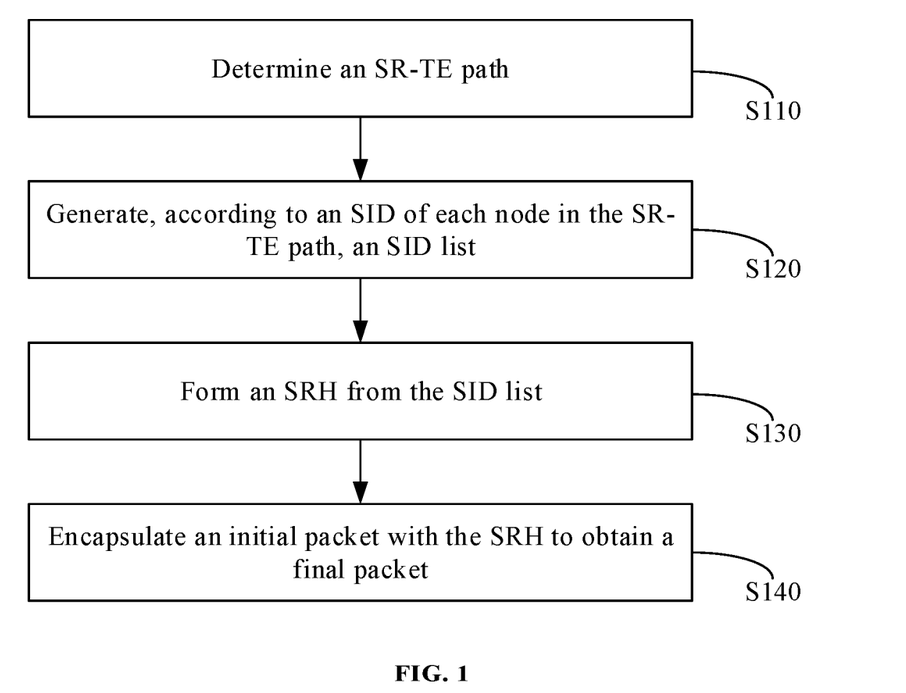
FIG. 1 is a flowchart of a packet encapsulation method according to an embodiment of the present disclosure.

In view of this, as a first aspect of the present disclosure, there is provided a packet encapsulation method which, as shown in FIG. 1, includes the following operations S110 to S140.

At operation S110, determining a segment routing-traffic engineering (SR-TE) path.

At operation S120, generating, according to a segment identifier (SID) of each node in the SR-TE path, an SID list. Each node supports a plurality of unified-SID encapsulation types (UETs) corresponding to SIDs of different lengths, and in the SID list, the SID of at least a node serving as an intermediate node of the SR-TE path is the SID having the non-longest length in the plurality of SIDs corresponding to the node.

At operation S130, forming a segment routing header (SRH) from the SID list.

At operation S140, encapsulating an initial packet with the SRH to obtain a final packet.

It should be noted that the final packet is a service packet, and the SR-TE path includes a plurality of nodes through which the service packet is forwarded, including a head node, at least one intermediate node, and a tail node.

The packet encapsulation method of the present disclosure may be performed by the head node in the SR-TE path. Each node supports multiple UETs, and each node may set different lengths of SIDs for different UETs thereof.

According to the packet encapsulation method of the present disclosure, the SID list includes SIDs with non-longest lengths among the plurality of SIDs corresponding to each node, so that the SID list, and thus the finally formed SRH, are relatively short, thereby improving the load rate of the final packet.

A generation method of the present disclosure is explained below with reference to FIG. 8.

Figure 8:
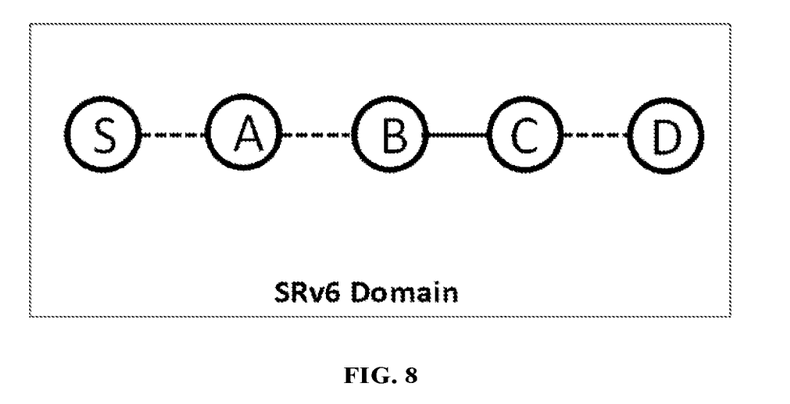
FIG. 8 is a network topology diagram of specific embodiments I and II of the present disclosure.

As shown in FIG. 8, the SR-TE path for forwarding a packet is node S→node A→node B→node C→node D.

In the existing art, each node in the SR-TE path has an SID length of 128 bits. In the generation method of the present disclosure, the node A in the SR-TE path has an SID length of 32 bits, the node C has an SID length of 64 bits, and the node D may have an SID length of 128 bits. It can be seen that the final SID list generated in the generation method of the present disclosure has a shorter length than the SID list generated in the existing art.

The present disclosure will be described in detail below taking an SRv6 network as an example.

In the SRv6 network, each node may configure and announce to the outside the supported SID compression capability of the node, so that all nodes in the network can learn about the SID compression capabilities of other nodes. The SID compression capability is referred to herein as unified-SID encapsulation type (UET). For example, each node may be configured to support the following UETs:

UET(0): supports merely an existing 128-bit IPv6 address as an SID, i.e., the existing classical SRv6 SID.

UET(1): in addition to the existing 128-bit IPv6 address, further supports a 32-bit IPv4 address or value as an SID.

UET(2): in addition to the existing 128-bit IPv6 address, further supports a 32-bit MPLS label as an SID. The higher 20 bits of the 32 bits store the MPLS label, and the lower 12 bits store other auxiliary information.

UET(3): in addition to the existing 128-bit IPv6 address, further supports a 64-bit value as an SID.

UET(4): in addition to the existing 128-bit IPv6 address, further supports a 16-bit value as an SID.

UET(5): in addition to the existing 128-bit IPv6 address, further supports an 8-bit value as an SID.

Apparently, the present disclosure is not limited thereto.

As another aspect of the present disclosure, there is provided a UET announcement method, including:

broadcasting information carrying a current node UET attribute to a network.

As mentioned above, in view of current chip capabilities in the industry and for ease of extension of control plane protocols, a short SID of 32 bits is more advantageous. Therefore, in general, one SRv6 node may be configured to support both compression capabilities UET(0) and UET(1) at the same time, and another SRv6 node may be configured to support both compression capabilities UET(0) and UET (2) at the same time. In other words, each SRv6 node has to support the classical 128-bit SRv6 SID, and besides, the capability of supporting distinctive shorter compressed SIDs is introduced. Apparently and theoretically, a certain SRv6 node, such as a boundary node, may be configured to support more compression capabilities, such as UET(0), UET(1), UET(2), UET(3), UET(4), UET(5), and the like, at the same time, so that switching of different lengths of SIDs can be performed on the boundary node.

Figure 2:
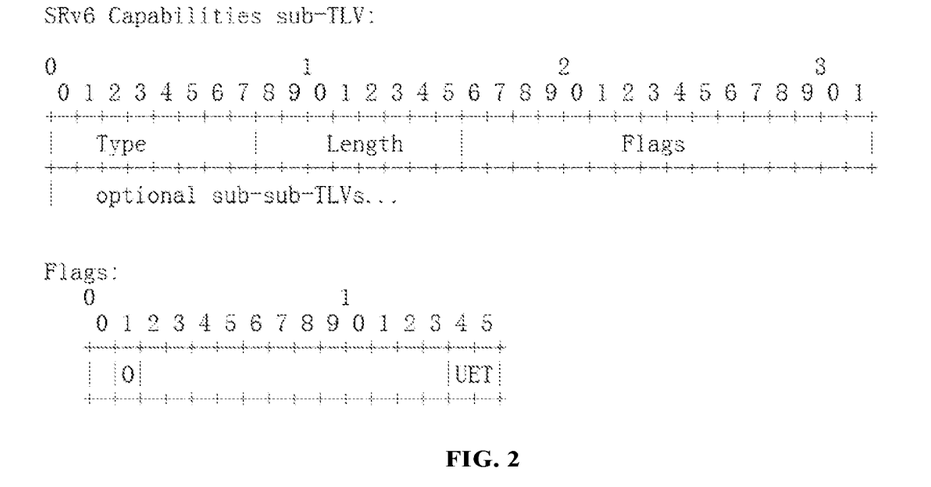
FIG. 2 is a schematic diagram showing new UET flags in ISIS SRv6 Capabilities sub-TLV representing different SID compression capabilities according to an embodiment of the present disclosure.

A specific implementation of extending the existing protocol in the control plane to announce the SID compression capability is as follows:

1) draft-ietf-lsr-isis-srv6-extensions-05 defines an Intermediate System to Intermediate System (ISIS) protocol extended and supported SRv6, and each node may announce a SRv6 capability thereof to the outside, which is achieved by including a new SRv6 Capabilities sub-TLV in the router capabilities TLV defined in RFC7981. In the present disclosure, the SID compression capability information will continue to be carried in SRv6 Capabilities sub-TLV. As shown in FIG. 2, in the Flags field of SRv6 Capabilities sub-TLV, a new UET flag of two bits is defined to support announcement of various typical SID compression capabilities, where values and meanings of the UET flag are as follows:

0b00: supporting merely an existing 128-bit IPv6 address as an SID.

0b01: in addition to the existing 128-bit IPv6 address, further supporting a 32-bit IPv4 address or value as an SID.

0b10: in addition to the existing 128-bit IPv6 address, further supporting a 32-bit MPLS label as an SID. The higher 20 bits of the 32 bits store the MPLS label, and the lower 12 bits (referred to as Context Field) store other auxiliary information.

0b11: supporting all the capabilities described above.

Figure 3:
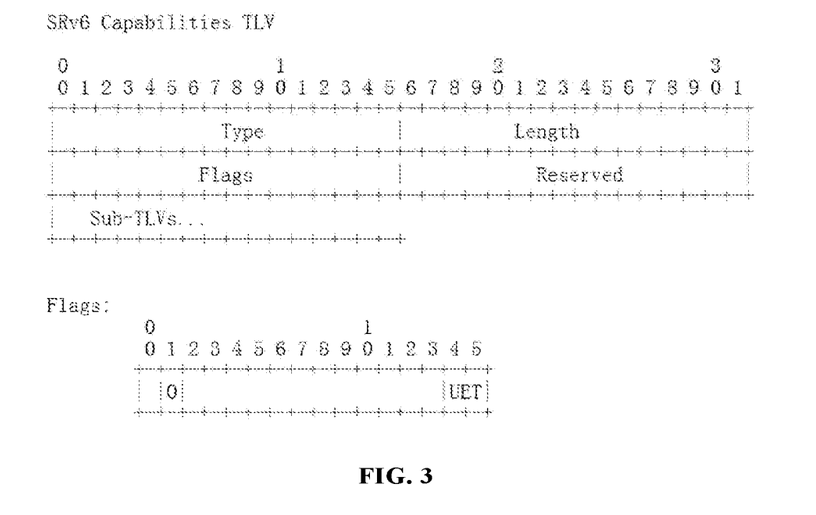
FIG. 3 is a schematic diagram showing new UET flags in OSPFv3 SRv6 Capabilities TLV representing different SID compression capabilities according to an embodiment of the present disclosure.

2) draft-ietf-lsr-ospfv3-srv6-extensions-00 defines an Open Shortest Path First (OSPFv3) extended and supported SRv6, and each node may announce a SRv6 capability thereof to the outside, which is achieved by including a new SRv6 Capabilities TLV in the OSPFv3 Router Information LSA defined in RFC7770. In the present disclosure, the SID compression capability information will continue to be carried in SRv6 Capabilities TLV. As shown in FIG. 3, in the Flags field of SRv6 Capabilities TLV, a new UET flag of two bits is defined to support announcement of various typical SID compression capabilities, where values and meanings of the UET flag may refer to those in the above ISIS part, and thus are not repeated here.

3) Similarly, draft-ietf-idr-bgpls-srv6-ext-02 defines a North-Bound Distribution of Link-State and Traffic Engineering information Using BGP (BGP-LS, see RFC7752) extended SRv6 to support reporting of SRv6 information of each node in the network to the controller. According to the announcement method of the present disclosure, the SID compression capability information is added and carried in the reported SRv6 capability information, so that when end-to-end path computation results are translated into a SID list, the controller can sense SID compression capability information of all nodes passed by on the path, identify boundary nodes connecting different compressed SID types, and then select a SID of a proper type. The SRv6 Capabilities TLV defined in BGP-LS and the added SID compression capability information are similar to those in IGP, and detailed description is omitted.

In the SRv6 network, each node may, according to the supported SID compression capability thereof, apply for an SID in a distribution mode of per SRV6 SID per SID compression capability, that is, each SRv6 SID has a specific UET attribute, and announce the SID with the UET attribute to the outside, so that all nodes in the network can learn about the SIDs of other nodes.

Figure 4:
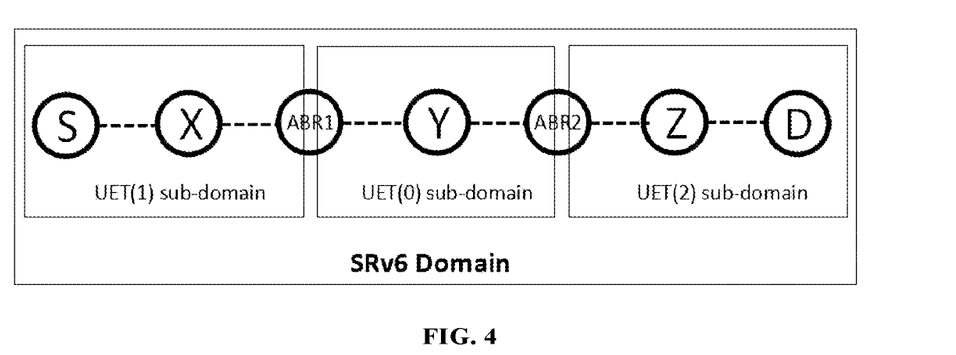
FIG. 4 is a schematic diagram of an SRv6 domain consisting of different compressed domains as according to an embodiment of the present disclosure.

As shown in FIG. 4, in the entire SRv6 domain, since the compression capability supported by a local region in the network upgrades, three sub-domains using compressed SIDs of different lengths are included in the entire SRv6 domain. For example, since ABR1 supports both UET(0) and UET(1), then it may allocate two types of SIDs for these two UETs. For example, for the END SID, ABR1 may allocate END SID abr1-sid1 for UET(0), and END SID abr1-sid2 for UET(1). Similarly, since ABR2 supports both UET(0) and UET(2), it may allocate END SID abr2-sid1 for UET(0), and END SID abr2-sid2 for UET(2). For other types of SIDs, such as topology-dependent SIDs like END.X or service function-dependent SIDs, different SIDs may be allocated for different UETs. Theoretically, all types of SIDs may be used for allocating different SIDs for different UETs, but considering the actual situation, since an SID related to an overlay virtual private network (VPN) service type (e.g., an SID related to a L3VPN or EVPN service) generally appears at a rooter of the SID list, and such a case does not involve handling changes in the length of the SID, the SID related to an overlay service type is not proposed to be used in allocating different SIDs for different UTEs, so as to save SID resources.

After allocating the SID with a specific UET attribute, an SRv6 node will create a corresponding Local SID table entry locally, and give the explicit UET attribute in function processing of the Local SID table entry.

In the SID list contained in SRH, for a certain SID with a certain UET attribute, a prompt of the compressed SID mode for the SID that follows it, i.e., a next SID, is given. For example, if the UET attribute value is 0, the next SID is an existing 128-bit IPv6 address, if the UET attribute value is 1, the next SID is a 32-bit IPv4 address or value, and if the UET attribute value is 2, the next SID is a 32-bit MPLS label, and so on and so forth.

Figure 5:
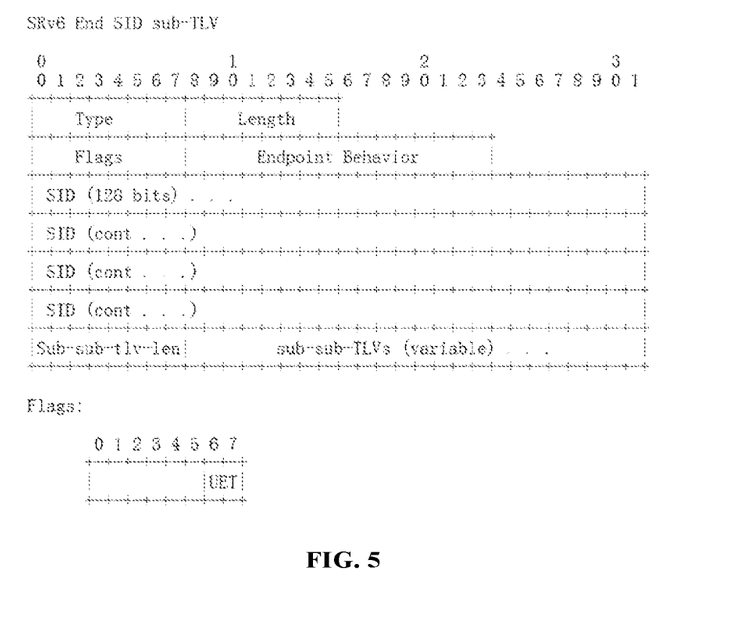
FIG. 5 is a schematic diagram showing new UET flags in ISIS SRv6 End SID sub-TLV representing allocation and announcement per SID per UET according to an embodiments of the present disclosure.

A specific implementation of extending the existing protocol in the control plane to announce per SID per UET is as follows:

1) draft-ietf-lsr-isis-srv6-extensions-05 defines an ISIS extended and supported SRv6, and each node may announce the allocated SID thereof to the outside. SRv6 Locator TLV is introduced, in which an SRv6 End SID sub-TLV is introduced to carry an END SID. SRv6 End.X SID sub-TLV is introduced to carry an END.X SID of a point-to-point link; and SRv6 LAN End.X SID sub-TLV is introduced to carry a LAN END.X SID of a broadcast link. In the present disclosure, new UET attributes are further added into the existing SID announcement. As shown in FIG. 5, in the Flags field of SRv6 End SID sub-TLV, a new UET flag of two bits is defined to indicate the UET attribute of the End SID. Values and meanings of the UET flag are as follows:

0b00: indicating that the next SID is a 128-bit IPv6 address.

0b01: indicating that the next SID is a 32-bit IPv4 address or value.

0b10: indicating that the next SID is a 32-bit MPLS label.

0b11: reserved, undefined.

Similarly, a new UET flag of two bits is defined in the Flags fields of SRv6 End.X SID sub-TLV and SRv6 LAN End.X SID sub-TLV respectively, to indicate the UET attribute of the corresponding END.X SID or LAN END.X SID, which is not described in detail here.

Explanation: for a UET(1) type SID announcement, information about a method for converting a 32-bit IPv4 address or value into a classical 128-bit SRv6 SID should be provided. SRv6 SID Structure Sub-Sub-TLV has been defined in the current draft-ietf-lsr-isis-srv6-extensions-05 as sub-sub-TLV included in the SRv6 End SID Sub-TLV, the SRv6 End.X SID sub-TLV and the SRv6 LAN End.X SID sub-TLV described above, and provides a specific structure of the corresponding SID, including a length of a SRv6 SID locator block, a length of SRv6 SID locator node, a length of SRv6 SID function, and a length of SRv6 SID arguments, all in bits. Therefore, the existing art discloses a very intuitive conversion method in which under a specific address plan, a higher bit part of the UET(1) type 128-bit SRv6 SID is a SRv6 SID locator block (which is a common address part of all nodes in the SRv6 domain), the following 32 bits are composed of SRv6 SID locator node, SRv6 SID function, and SRv6 SID arguments, and the rest bits are zero-padded. In other words, in the SID list, a classical 128-bit SRv6 SID sid1 with the UET(1) attribute suggests that the next SID sid2 is a 32-bit IPv4 address or value, and then in the method for converting the next SID sid2 into a complete classical 128-bit SRv6 SID sid2', a higher bit part of the sid2' is SRv6 SID locator block information provided by the higher bit part of the sid1, the following 32 bits are SRv6 SID locator node, SRv6 SID function, and SRv6 SID arguments information (some may be 0) provided by the sid2, and the rest bits are zero-padded.

Figure 6:
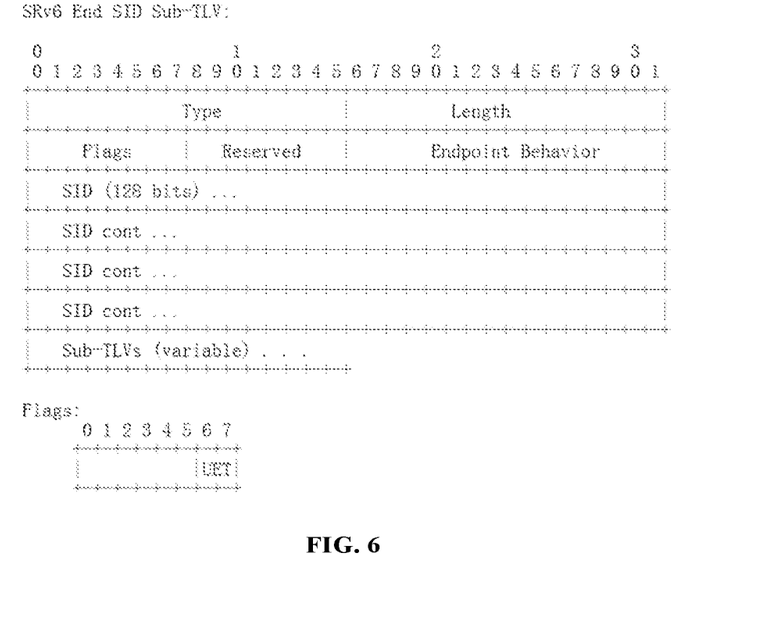
FIG. 6 is a schematic diagram showing new UET flags in OSPFv3 SRv6 End SID Sub-TLV representing allocation and announcement per SID per UET according to an embodiments of the present disclosure.

2) The draft-ietf-lsr-OSPFv3-srv6-extensions-00 defines an OSPFv3 extended and supported SRv6, and each node may announce the allocated SID thereof to the outside. SRv6 Locator LSA and SRv6 Locator TLV are introduced, in which SRv6 End SID Sub-TLV is included in SRv6 Locator TLV to carry an END SID; SRv6 End.X SID Sub-TLV is introduced to carry an END.X SID of a point-to-point link; and SRv6 LAN End.X SID Sub-TLV is introduced to carry a LAN END.X SID of a broadcast link. In the present disclosure, new UET attributes are further added into the existing SID announcement. As shown in FIG. 6, in the Flags field of SRv6 End SID Sub-TLV, a new UET flag of two bits is defined to indicate the UET attribute of the End SID. Values and meanings of the UET flag may refer to those in the above ISIS part, and thus are not repeated here.

Similarly, a new UET flag of two bits is defined in the Flags fields of SRv6 End.X SID Sub-TLV and SRv6 LAN End.X SID Sub-TLV respectively, to indicate the UET attribute of the corresponding END.X SID or LAN END.X SID, which is not described in detail here.

3) draft-ietf-idr-bgpls-srv6-ext-02 defines an BGP-LS extended SRv6, to support reporting of SRv6 information of each node in the network to the controller. SRv6 SID NLRI, SRv6 SID Information TLV, and SRv6 Endpoint Behavior TLV are introduced, in which SRv6 SID Information TLV includes an END SID, and SRv6 Endpoint Behavior TLV includes an attribute of the END SID; SRv6 End.X SID TLV is introduced to carry an END.X SID in a point-to-point link attribute; SRv6 LAN End.X SID TLV is introduced to carry an LAN END.X SID in a broadcast link attribute. In the present patent, a new UET attribute is added into the reported SRv6 SID information. In other words, a new UET flag of two bits is defined in the Flags fields of SRv6 Endpoint Behavior TLV, SRv6 End.X SID TLV, and SRv6 LAN End.X SID TLV respectively, to indicate the UET attribute of the corresponding SID. The specific extension is similar to that of IGP as described above, and thus is not repeated here. Therefore, when end-to-end path computation results are translated into a SID list, the controller can select a suitable SID with a specific UET as desired.

For a node in the compression domain using UET(2) (i.e., using a 32-bit MPLS label as the SID), theoretically, it is possible to apply for an SR-MPLS SID in an allocation method of per SR-MPLS SID per UET similar to that of the SRv6 SID. For example, in FIG. 4, an ABR2 node may allocate SR-MPLS Prefix-SID abr2-node-sid1 for UET(0) and SR-MPLS Prefix-SID abr2-node-sid2 for UET(2), but this method may waste precious MPLS label sources. In fact, in the SID list of SRH, each MPLS label type SID takes merely 20 bits, and the rest 12 bits (Context Field) may store the UET information to indicate a SID type of the next SID, which may refer to in FIG. 7 for details.

In the SRv6 network, as shown in FIG. 4, a head node S (or request controller) may compute a segment routing traffic engineering (SR-TE) path from the head node S to a destination node D. The path may pass through multiple compressed sub-domains with different UETs, and the corresponding SR-TE path is desired to use a SID list of suitable SIDs with specific UET attributes. Assuming that the SR-TE path from S to D corresponds to a segment list, <X, ABR1, Y, ABR2, Z, D>, consisting of a plurality of loose nodes, in the existing art without any compression scheme, this segment list would be translated into a SID list <128bits-end-sid-x, 128bits-end-sid-abr1, 128bits-end-sid-y, 128bits-end-sid-abr2, 128bits-end-sid-z, 128bits-end-sid-d>. However, considering the capabilities of the compression sub-domains discussed in the present disclosure, the head node or controller knows that node S/X/ABR1 has the compression capability of UET(1), node ABR1/Y/ABR2 has the compression capability of UET(0), and node ABR2/Z/D has the compression capability of UET(2), it can be therefore inferred that node ABR1 is a boundary node between two different compression domains (UET(1) and UET(0)), and node ABR2 is a boundary node between two different compression domains (UET(0) and UET(2)), and further combining the per SID per UET information announced to the outside by each node, this segment list can be actually expressed as <X (with UET(1) attribute), ABR1 (with UET (0) attribute), Y (with UET(0) attribute), ABR2 (with UET (2) attribute), Z (with UET(2) attribute), D (with UET(0) attribute)>. Note that each of the above UET attributes suggests a type of the next SID, so the segment list can be translated into a SID list consisting of partially shortened SIDs, i.e., <32bits-ipv4-x, 32bits-ipv4-abr1, 128bits-end-sid-y, 128bits-end-sid-abr2, 32bits-label-z, 32bits-label-d>. Further explanation is set below.

For example, for the END SID allocated by node X, i.e., 128bits-end-sid-x, the UET attribute in the corresponding local SID table entry is UET(1), indicating that the next SID, i.e., 32bits-ipv4-abr1, is a 32-bit IPv4 address or value.

Note that at node S, the shorter 32bits-ipv4-x (a 32-bit IPv4 address) is firstly converted into 128bits-end-sid-x (a complete classical 128-bit SRv6 END SID), and then copied into a destination address (DA) field of the IPv6 header, and then, the packet is directed to be forwarded to node X. The specific conversion method may include combining 32bits-ipv4-x with 128bits-end-sid-s (a complete classical 128-bit SRv6 END SID with the UET(1) attribute). That is, a higher bit part of 128bits-end-sid-x is provided by the higher bit part of 128bits-end-sid-s, the following 32bits are provided by 32bits-ipv4-x, and the rest bits are zero-padded. Alternatively, in a simpler implementation, the node S actually knows that the first SID in the SID list is 128bits-end-sid-x, and directly copies 128bits-end-sid-x into the DA field of the IPv6 header, except that the logic first SID in the SRH is recorded as 32bits-ipv4-x.

For example, for the END SID allocated by node ABR1, i.e., 128bits-end-sid-abr1, the UET attribute in the corresponding local SID table entry is UET(0), indicating that the next SID, i.e., 128bits-end-sid-y, is a classical 128-bit SRv6 SID. Note that at node X, the shorter 32bits-ipv4-abr1 is also desired to be firstly converted into 128bits-end-sid-abr1, and then copied into destination address (DA) field of the IPv6 header, and then the packet is directed to be forwarded to node ABR1. The specific conversion method may include combining 32bits-ipv4-abr1 with 128bits-end-sid-x (a complete classical 128-bit SRv6 END SID with the UET(1) attribute). That is, a higher bit part of 128bits-end-sid-abr1 is provided by the higher bit part of 128bits-end-sid-x, the following 32bits are provided by 32bits-ipv4-abr1, and the rest bits are zero-padded.

For example, for the END SID allocated by node Y, i.e., 128bits-end-sid-y, the UET attribute in the corresponding local SID table entry is UET(0), indicating that the next SID, i.e., 128bits-end-sid-abr2, is a classical 128-bit SRv6 SID.

For example, for the END SID allocated by node ABR2, i.e., 128bits-end-sid-abr2, the UET attribute in the corresponding local SID table entry is UET(2), indicating that the next SID, i.e., 32bits-label-z, is a 32-bit MPLS label.

For example, for the MPLS label allocated by node Z, i.e., 32bits-label-z, it is not related to UET, and in the SID list of SRH, the Context Field of SID 32bits-label-z stores the corresponding UET attribute as UET(2), indicating that the next SID, i.e., 32bits-label-d, is a 32-bit MPLS label. Note that the node ABR2 is desired to firstly map the 32bits-label-z to a 128-bit IPv6 address, and then copy the address into a destination address (DA) field of the IPv6 header, and then, the packet is directed to be forwarded to node Z. The specific mapping method may include searching a corresponding Incoming Label Map (ILM) table entry, and acquiring FEC information from the ILM table entry. For example, the prefix FEC provides the IPv6 address to a remote node, and Adjacency FEC provides the IPv6 address to a peer interface of a link.

For example, for the MPLS label allocated by node D, i.e., 32bits-label-d, it is not related to UET, and in the SID list of SRH, the Context Field of SID 32bits-label-d stores the corresponding UET to indicate the type of the next SID. For example, if there is a classical 128-bit SRv6 SID associated with a VPN service at the rooter of the SID list of SRH, then the UET stored in the Context Field of SID 32bits-label-d is UET(0). Note that the node Z is also desired to firstly map the 32bits-label-d to a 128-bit IPv6 address, and then copied into the DA field of the IPv6 header, and then, the packet is directed to be forwarded to node D.

If the SR-TE path is computed by the controller, the controller is desired to deliver a path computation result (SID list) to the head node S, and in the delivered SID list, the UET attribute of each SID is given, so that the head node can use the compressed SIDs when encapsulating the packet with SRH, and assemble these SIDs in the SRH in order.

The specific implementation for extending an SDN southbound channel to enable the controller to deliver the path computation result carrying the UET attribute is as follows:

1) draft-ietf-pce-segment-routing-ipv6-03 defines a PCEP channel delivering an SRv6 TE tunnel, in which SRv6-ERO Subobject is introduced to carry a classical 128-bit SRv6 SID. In the present application, a new UET flag of two bits is defined in the Flags fields to indicate the UET attribute of the corresponding SID. The specific extension and values and meanings of the UET attribute are similar to those described above, and are not described in detail here.

In addition, RFC8664 defines a PCEP channel delivering an SR-MPLSTE tunnel, in which SR-ERO Subobject is introduced to carry SR-MPLS SID. The present disclosure believed that an end-to-end SID list traversing multiple different UET compression domains may include a classical SRv6 SID, an SID represented by a 32-bit IPv4 address or value, and an SID represented by a 32-bit MPLS label at the same time. For this reason, in the present disclosure, a new UET flag of two bits will also be defined in the Flags field of SR-ERO Subobject to indicate the UET attribute of the corresponding SID. The specific extension and values and meanings of the UET attribute are similar to those described above, and are not described in detail here.

2) draft-ietf-idr-segment-routing-te-policy-08 defines a BGP channel delivering an SR-MPLS policy or SRv6 TE policy, in which Segment sub-TLV is introduced to carry various types of segments, which are currently known as type A to type K. In the present disclosure, a new UET flag of two bits is defined in the Flags fields of these types of segments respectively to indicate the UET attribute of the corresponding segment. The specific extension and values and meanings of the UET attribute are similar to those described above, and are not described in detail here.

For example, for the SR-TE path from S to D shown in FIG. 4, the controller obtains by computation that the corresponding segment list is <X, ABR1, Y, ABR2, Z, D>, and then delivers to the head node S, according to the compression capability of each node and the per SID per UET information announced by each node to the outside, an SID list <128bits-end-sid-x (with UET(1) attribute), 128bits-end-sid-abr1 (with UET(0) attribute), 128bits-endsid-y (with UET(0) attribute), 128bits-end-sid-abr2 (with UET(2) attribute), 32bits-label-z (with UET(2) attribute), 32bits-label-d (with UET(0) attribute)>. Note that each of the above UET attributes suggests a type of the next SID, so when the head node encapsulates the packet with SRH, a SID list consisting of shorter SIDs, i.e., <32bits-ipv4-x, 32bits-ipv4-abr1, 128bits-end-sid-y, 128bits-end-sid-abr2, 32bits-label-z, 32bits-label-d>, may be used.

Figure 7:
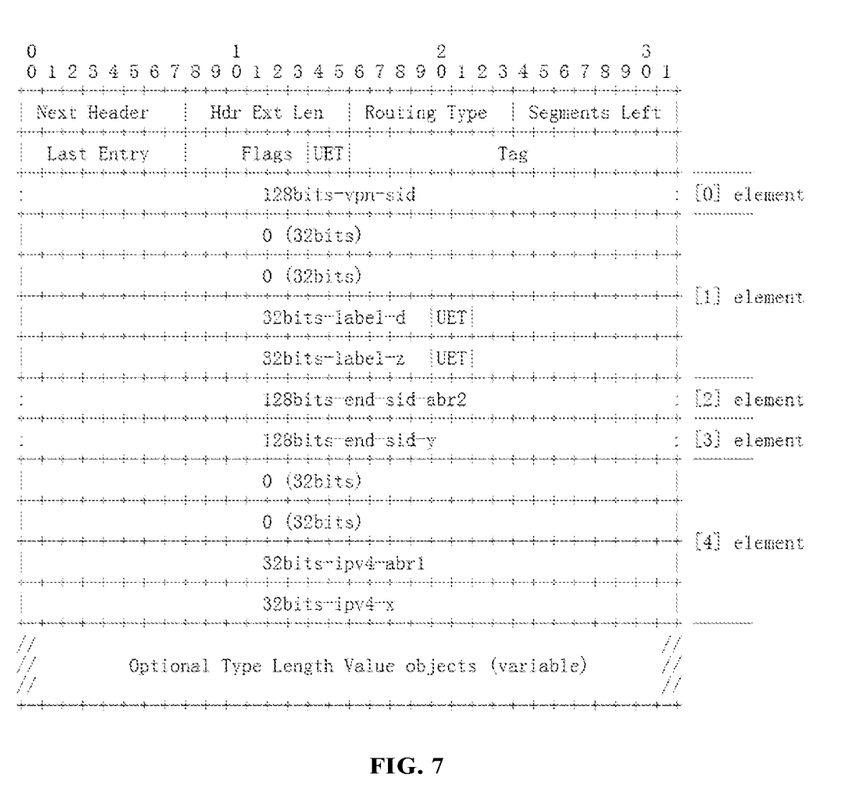
FIG. 7 is a diagram showing an encapsulation format of adding new UET flags into an extended SRv6 SRH and mixing different lengths of SIDs according to an embodiment of the present disclosure.

In the SRv6 network, as shown in FIG. 4, for the SRv6-TE path from S to D, the corresponding segment list is <X, ABR1, Y, ABR2, Z, D>. When a VPN service packet is forwarded along the SR-TE path, and the head node S encapsulates the packet with SRH, a SID list consisting of shorter SIDs, i.e., <32bits-ipv4-x, 32bits-ipv4-abr1, 128bits-end-sid-y, 128bits-end-sid-abr2, 32bits-label-z, 32bits-label-d, 128bits-vpn-sid>, may be used. In order to be compatible with the existing SRv6 encapsulation method based on the 128-bit SID in SRH encapsulation, the present disclosure proposes the following encapsulation method:

1) In the Flags field of the existing SRH, a new UET flag (denoted as SRH.UET) of two bits is defined, as shown FIG. 7, to indicate a type of the compression domain where the current packet is located. Values and meanings of SRH.UET are as follows:

0b00: indicating that the current compression domain adopts a compression mode using a 128-bit IPv6 address as an SID.

0b01: indicating that the current compression domain adopts a compression mode using a 32-bit IPv4 address or value as an SID.

0b10: indicating that the current compression domain adopts a compression mode using a 32-bit MPLS label as an SID.

0b11: reserved, undefined.

2) With the classical 128-bit basic unit, adjacent shorter SIDs may be assembled together in a 128-bit basic unit, with spare bits padded with zeros.

As shown in FIG. 7, a specific encapsulation example of the SID list <32bits-ipv4-x, 32bits-ipv4-abr1, 128bits-end-sid-y, 128bits-end-sid-abr2, 32bits-label-z, 32bits-label-d, 128bits-vpn-sid> is shown. Note that according to the definition of draft-ietf-6man-segment-routing-header-26, the SID list (denoted as SRH.List[ ]) in SRH is stored in a reversed order, so that SRH.List[0] stores a logically last SID therein, namely 128bits-vpn-sid, and List[4] stores a logically first SID therein, namely, consisting of entries 32bits-ipv4-x, 32bits-ipv4-abr1, and two zero-padded 32-bit entries. At this time, it indicates that SRH.List contains five 128-bit basic units, and Segment Left (denoted as SRH.SL) in SRH has an initial value 5. SRH.UET is initially set to 0b01, to reflect a compression type UET(1) adopted by the logically first SID (i.e., 32bits-ipv4-x).

Note that in the Context Field occupying the lower 12 bits of 32bits-label-z, the UET attribute is set to 0b10, indicating that the next SID is a 32-bit MPLS label; and in the Context Field occupying the lower 12 bits of 32bits-label-d, the UET attribute is set to 0b00, indicating that the next SID is a classical 128-bit SRv6 SID, as shown in FIG. 7.

Note that the SID represented by the 32-bit IPv4 address may be placed in a same 128-bit basic unit as the SID represented by the 32-bit MPLS label, which will be discussed in the following specific embodiments.

Figure 11:
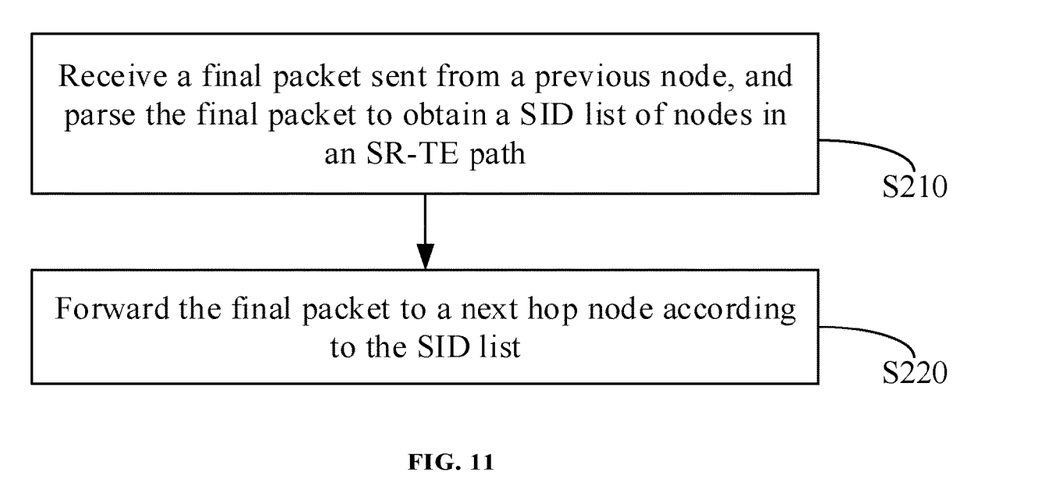
FIG. 11 is a flowchart of a packet forwarding method according to the present disclosure.

The present disclosure further provides a packet forwarding method. Optionally, as shown in FIG. 11, the packet forwarding method includes the following operations S210 to S220.

At operation S210, receiving a final packet sent from a previous node, and parsing the final packet to obtain a SID list of nodes in a segment routing-traffic engineering (SR-TE) path. The final packet is a final packet obtained by the encapsulation method according to the present disclosure.

At operation S220, forwarding the final packet to a next hop node according to the SID list.

The case of forwarding a packet from the head node S to the logically first segment node, i.e., node X will be discussed in detail below. Since SRH.UET is 0b01, indicating that the current compression domain is a UET(1) type, where each SID occupies merely 32 bits, i.e., one fourth of the classical 128-bit SRv6 SID, while a value (i.e., 5) of the SRH.SL indicates how many classical 128-bit SRv6 SIDs are left to be processed. Therefore, the value of SRH.SL is increased by a factor of 4 times and updated, i.e., SRH.SL=SRH.SL*4, resulting in SRH.SL=20.

Then, the logically first SID in SRH is obtained, i.e., the following main codes are executed in order.

At Step 1: decreasing SRH.SL by 1 to 19.

At Step 2: reading SRH.List[SRH.SL] to obtain 32bits-ipv4-x. Note that SRH.UET indicates that the current compression domain is a UET(1) type, so each time an element is read from SRH.List[ ], merely 32 bits are read.

At Step 3: converting 32bits-ipv4-x into 128bits-end-sid-x, and then copying into a DA field of an outer IPv6 header. The conversion method may refer to the above description.

At Step 4: searching a routing table to forward a packet to node X according to the DA of the outer IPv6 header.

When the packet reaches node X, according to the current DA equal to 128bits-end-sid-x, a local SID table entry is hit and gives a UET attribute UET(1), which is updated to SRH.UET, so the next SID is still a 32-bit IPv4 address, and node X executes the following main codes in order.

At Step 1: decreasing SRH.SL by 1 to 18.

At Step 2: reading SRH.List[SRH.SL] to obtain 32bits-ipv4-abr1. Note that SRH.UET indicates that the current compression domain is a UET(1) type, so each time an element is read from SRH.List[ ], merely 32 bits are read.

At Step 3: converting 32bits-ipv4-abr1 into 128bits-end-sid-abr1, and then copying into a DA field of an outer IPv6 header. The conversion method may refer to the above description.

At Step 4: searching a routing table to forward a packet to node ABR1 according to the DA of the outer IPv6 header.

When the packet reaches node ABR1, according to the current DA equal to 128bits-end-sid-abr1, a local SID table entry is hit and gives a UET attribute UET(0), which is updated to SRH.UET, the next SID is a classical 128-bit SRv6 SID, namely, the compression domain is to be converted into a conventional classical SRv6 domain, so node ABR1 is desired to restore SRH.SL to a count in units of the classical 128-bit SRv6 SID by dividing SRH.SL by 4 and rounding to update the value of SRH.SL, i.e., SRH.SL=SRH.SL/4, resulting in SRH.SL=4. Then, the following main codes are executed in order.

At Step 1: decreasing SRH.SL by 1 to 3.

At Step 2: reading SRH.List[SRH.SL] to obtain 128bits-end-sid-y. Note that SRH.UET indicates that the current compression domain is a UET(0) type, so each time an element is read from SRH.List[ ], 128 bits are read.

At Step 3: copying 128bits-end-sid-y to the DA field of the outer IPv6 header.

At Step 4: searching a routing table to forward a packet to node Y according to the DA of the outer IPv6 header.

Explanation: the above codes actually represent the current classical processing on SRH by SRv6, which is completely compatible with the present disclosure. In other words, nodes in the UET(0) type compression domain are total unaware of the mixed SIDs of different lengths in SRH.

When the packet reaches node Y, according to the current DA equal to 128bits-end-sid-y, a local SID table entry is hit and gives a UET attribute UET(0), which is updated to SRH.UET, so the next SID is still a classical 128-bit SRv6 SID, and the following main codes are executed in order.

At Step 1: decreasing SRH.SL by 1 to 2.

At Step 2: reading SRH.List[SRH.SL] to obtain 128bits-end-sid-abr2. Note that SRH.UET indicates that the current compression domain is a UET(0) type, so each time an element is read from SRH.List[ ], 128 bits are read.

At Step 3: copying 128bits-end-sid-abr2 to the DA field of the outer IPv6 header.

At Step 4: searching a routing table to forward a packet to node ABR2 according to the DA of the outer IPv6 header.

Explanation: the above codes actually represent the current classical processing on SRH by SRv6.

When the packet reaches node ABR2, according to the current DA equal to 128bits-end-sid-abr2, a local SID table entry is hit and gives a UET attribute UET(2), which is updated to SRH.UET, so the next SID is a 32-bit MPLS label, namely, the compression domain is to be converted into a domain compressed with an MPLS label where each SID takes merely 32 bits, i.e., one fourth of the classical 128-bit SRv6 SID, while a current value (i.e., 2) of the SRH.SL indicates how many classical 128-bit SRv6 SIDs are left to be processed. Therefore, the value of SRH.SL is increased by a factor of 4 times and updated, i.e., SRH.SL=SRH.SL*4, resulting in SRH.SL=8. Then, the following main codes are executed in order.

At Step 1: decreasing SRH.SL by 1 to 7.

At Step 2: reading SRH.List[SRH.SL] to obtain 32bits-label-z. Note that SRH.UET indicates that the current compression domain is a UET(2) type, so each time an element is read from SRH.List[ ], merely 32 bits are read.

At Step 3: acquiring the UET value 0b10 stored in the Context Field of 32bits-label-z, and updating the UET value 0b10 to SRH.UET.

At Step 4: mapping 32bits-label-z into an IPv6 address (which is a local address on node Z), and then copying into a DA field of an outer IPv6 header. The mapping method may refer to the above description.

At Step 5: searching a routing table to forward a packet to node Z according to the DA of the outer IPv6 header.

When the packet reaches node Z, if a local address routing table entry is hit according to the current DA, there is no update to SRH.UET. Then, SRH is further parsed, and since SRH.UET is 0b10, the next SID is still a 32-bit MPLS label, and the following main codes are executed in order.

At Step 1: decreasing SRH.SL by 1 to 6.

At Step 2: reading SRH.List[SRH.SL] to obtain 32bits-label-d. Note that SRH.UET indicates that the current compression domain is a UET(2) type, so each time an element is read from SRH.List[ ], merely 32 bits are read.

At Step 3: acquiring the UET value 0b00 stored in the Context Field of 32bits-label-d, and updating the UET value 0b00 to SRH.UET, which indicates that after the packet reaches node D, the compression domain is to be converted into a conventional classical SRv6 domain, so node Z is desired to pre-restore SRH.SL to a count in units of the classical 128-bit SRv6 SID by dividing SRH.SL by 4 and rounding to update the value of SRH.SL, i.e., SRH.SL=SRH.SL/4, resulting in SRH.SL=1.

At Step 4: mapping 32bits-label-d into an IPv6 address, and then copying into a DA field of an outer IPv6 header. The conversion method may refer to the above description.

At Step 5: searching a routing table to forward a packet to node D according to the DA of the outer IPv6 header.

When the packet reaches node D, if a local address routing table entry is hit according to the current DA, there is no update to SRH.UET. Then, SRH is further parsed, and since SRH.UET is 0b00, the next SID is a classical 128-bit SRv6 SID, and the following main codes are executed in order.

At Step 1: decreasing SRH.SL by 1 to 0.

At Step 2: reading SRH.List[SRH.SL] to obtain 128bits-vpn-sid. Note that SRH.UET indicates that the current compression domain is a UET(0) type, so each time an element is read from SRH.List[ ], 128 bits are read.

At Step 3: copying 128bits-vpn-sid to the DA field of the outer IPv6 header.

At Step 4: searching, according to the DA of the outer IPv6 header, a routing table to forward the packet which will hit a local SID table entry and be further processed according to the existing art.

From the above processing behavior on each node, the pseudo codes for a general processing flow is summarized as follows, and relate to merely key processing flows associated with the present disclosure:

The processing flow of the head node sending a packet includes:

S01. setting an initial value of SRH.UET to reflect a compression method for a logically first SID;
S02. setting an initial value of SRH.SL to be equal to an SID count in SRH.List[ ] in units of 128 bits;
S03. if (SRH.UET == 0b00) {
S04. decreasing SRH.SL by 1;
S05. reading a 128-bit SRH.List[SRH.SL] element and copying into a DA field of an IPv6 header; or, if the head node knows the SID list information before encapsulating SRH, directly copying a first SID into the DA field of the IPv6 header;
S06. searching, according to the DA of the outer IPv6 header, a routing table to forward a packet;
S07. }
S08. else if (SRH.UET == 0b01) {
S09. multiplying SRH.SL by 4;
S10. decreasing SRH.SL by 1;
S11. reading a 32-bit SRH.List[SRH.SL] element, converting the element into a 128-bit SRv6 SID, and then copying into the DA field of the IPv6 header; or, if the head node knows the SID list information before encapsulating SRH, directly copying a first SID into the DA field of the IPv6 header;

-continued

S12. searching, according to the DA of the outer IPv6 header, a routing table to forward a packet;
S13. }
S14. else if (SRH.UET == 0b10) {
S15. multiplying SRH.SL by 4;
S16. decreasing SRH.SL by 1;
S17. reading a 32-bit SRH.List[SRH.SL] element, searching an ILM table to map the element into a 128-bit IPv6 address, and then copying into the DA field of the IPv6 header; or, if the head node knows the SID list information before encapsulating SRH, directly copying a first SID into the DA field of the IPv6 header;
S18. searching, according to the DA of the outer IPv6 header, a routing table to forward a packet; or directly acquiring forwarding information from the matched ILM table entry to forward the packet;
S19. }

The processing flow of the intermediate node or tail node receiving a packet includes:

S01. searching a routing table according to the DA of the packet, and updating, if a local SID table entry is matched, a UET attribute in the local SID table entry into SRH.UET, multiplying SRH.SL by 4 if SRH.UET is updated from 0b00 to 0b01 or 0b10, and dividing SRH.SL by 4 if the SRH.UET is updated from 0b01 or 0b10 to 0b00; and not updating SRH.UET if a common address routing table entry is matched;

S02. if (SRH.SL == 0) {
S03. processing an inner layer load packaged by SRH;
S04. }
S05. else {
S06. if (SRH.UET == 0b00) {
S07. decreasing SRH.SL by 1;
S08. reading a 128-bit SRH.List element and copying into a DA field of an IPv6 header;
S09. searching, according to the DA of the outer IPv6 header, a routing table to forward a packet;
S10. }
S11. else if (SRH.UET == 0b01) {
S12. decreasing SRH.SL by 1;
S13. reading a 32-bit SRH.List element, converting the element into a 128-bit SRv6 SID, and then copying into the DA field of the IPv6 header;
S14. searching, according to the DA of the outer IPv6 header, a routing table to forward a packet;
S15. }
S16. else if (SRH.UET == 0b10) {
S17. decreasing SRH.SL by 1;
S18. reading a 32-bit SRH.List element, searching an ILM table to map the element into a 128-bit IPv6 address, and then copying into the DA field of the IPv6 header;
S19. acquiring the UET in the Context Field of the SRH.List element to update to SRH.UET, and dividing SRH.SL by 4 if the SRH.UET is updated from 0b10 to 0b00;
S20. searching, according to the DA of the outer IPv6 header, a routing table to forward a packet; or directly acquiring forwarding information from the matched ILM table entry to forward the packet;
S21. }
S22. }

It should be noted that, in the above operations, when a plurality of 32-bit SIDs are stored in a 128-bit basic unit, the operation of multiplying or dividing SRH.SL by 4 is involved. It is obvious that if a plurality of 16-bit SIDs are stored in a 128-bit basic unit, the operation of multiplying or dividing SRH.SL by 8 is involved; if a plurality of 64-bit SIDs are stored in a 128-bit basic unit, the operation of multiplying or dividing SRH.SL by 2 is involved; and if a plurality of 8-bit SIDs are stored in a 128-bit basic unit, the operation of multiplying or dividing SRH.SL by 16 is involved.

Specific Embodiment I

This embodiment describes a compression scheme where the entire SRv6 domain uses pure 32-bit IPv4 addresses or values as SIDs. In the SRv6 network shown in FIG. 8 in which the ISIS protocol is executed, all nodes are configured to support UET(0) and UET(1), and UET Flag=0b01 is contained in the SRv6 capability information of external flooding. A classical 128-bit SRv6 SID is allocated to each node per SID per UET. For example:

node S allocates an END SID end-sid-s-uet0 for UET(0), and an END SID end-sid-s-uet1 for UET(1).

Node A allocates an END SID end-sid-a-uet0 for UET(0), and an END SID end-sid-a-uet1 for UET(1).

Node B allocates an END SID end-sid-b-uet0 for UET(0), an END SID end-sid-b-uet1 for UET(1), and allocates to three link layers B->C an END.X SID end.x-sid-bc-uet0 for UET(0) and an END.X SID end.x-sid-bc-uet1 for UET(1).

Node C allocates an END SID end-sid-c-uet0 for UET(0), and an END SID end-sid-c-uet1 for UET(1).

Node D allocates an END SID end-sid-d-uet0 for UET(0), and an END SID end-sid-d-uet1 for UET(1).

Suppose that an SR-TE path is established from the head node S to the tail node D, and the segment list of the path is <node A, node B, link B->C, node D>, then the path may be obtained by computation by the head node itself, or by requesting the controller to compute.

When the segment list is to be translated into an SID list, the head node (or controller) will check route nodes passed through by the segment list (i.e., segments in the segment list), and obtain a common compression capability shared by all nodes. In this example, all the nodes have announced a UET(1) type compression capability to the outside, as well as the SIDs corresponding to UET(1), so the head node (or controller) can use merely SIDs corresponding to UET(1) in the SID list, namely, the SID list is <end-sid-a-uet1, end-sid-b-uet1, end.x-sid-bc-uet1, end-sid-d-uet1>.

However, if there is a VPN service to be carried on the SR-TE path, an SID related to the VPN service is further added to the rooter of the SID list. Assuming that the SID is an END.DT6 type SID, end.dt6-sid-d-uet0, the SID is allocated by node D and is a classical 128-bit SRv6 SID. It should be noted that, after end.dt6-sid-d-uet0 is added to the rooter of the SID list, end-sid-d-uet1, which is originally at the rooter, is replaced with end-sid-d-uet0, resulting in the SID list <end-sid-a-uet1, end-sid-b-uet1, end.x-sid-bc-uet1, end-sid-d-uet0, end.dt6-sid-d-uet0>.

Since the END.X type SRv6 SID itself is also routable, the SID list may be optimized to <end-sid-a-uet1, end.x-sid-bc-uet1, end-sid-d-uet0, end.dt6-sid-d-uet0>.

It is assumed that in the announcement of all the END or END.X type SIDs described above, it is suggested in the structure information of the SIDs that all the SIDs are in a same SRv6 SID locator block, and a length of SRv6 SID locator node+a length of SRv6 SID function+a length of SRv6 SID arguments in the structure information does not exceed 32 bits. For example:

in the structure of end-sid-a-uet1, the higher 32 bits are 32bits-block, which is the SRv6 SID locator block information, and the following 32 bits are 32bits-ipv4-a-uet1, which is the SRv6 SID locator node+SRv6 SID function information.

Similarly, in the structure of end-sid-b-uet1, the higher 32 bits are 32bits-block, and the following 32 bits are 32bits-ipv4-b-uet1.

in the structure of end.x-sid-bc-uet1, the higher 32 bits are 32bits-block, and the following 32 bits are 32bits-ipv4-bc-uet1.

in the structure of end-sid-d-uet0, the higher 32 bits are 32bits-block, and the following 32 bits are 32bits-ipv4-d-uet0.

Thereby, when the head node S encapsulates the packet with SRH, a shorter 32-bit IPv4 address or value may be used as an SID, that is, the compressed SID list is <32bits-ipv4-a-uet1,32bits-ipv4-bc-uet1,32bits-ipv4-d-uet0, end.dt6-sid-d-uet0>. In SRH, the first three SIDs are assembled into a 128-bit basic unit, and the rest space is padded with zeros. SRH.SL has an initial value 2, and SRH.UET is set to 0b01.

Next, the process of forwarding the packet along the SR-TE path is described:

1) The packet is forwarded from the head node S to the logically first segment node, i.e., node A. Since SRH.UET is 0b01, indicating that the current compression domain is a UET(1) type, where each SID occupies merely 32 bits, the value of SRH.SL is increased by a factor of 4 times and updated, i.e., SRH.SL=SRH.SL*4, resulting in SRH.SL=8.

Then, the logically first SID in SRH is obtained, i.e., the following main codes are executed in order.

At Step 1: decreasing SRH.SL by 1 to 7.

At Step 2: reading SRH.List[SRH.SL] to obtain 32bits-ipv4-a-uet1, where merely 32 bits are read.

At Step 3: converting 32bits-ipv4-a-uet1 into end-sid-a-uet1, and then copying into a DA field of an outer IPv6 header. The conversion method may refer to the above description.

At Step 4: searching a routing table to forward a packet to node A according to the DA of the outer IPv6 header.

2) When the packet reaches node A, according to the current DA equal to end-sid-a-uet1, a local SID table entry is hit and gives a UET attribute UET(1), which is updated to SRH.UET. Then, the following main codes are executed in order.

At Step 1: decreasing SRH.SL by 1 to 6.

At Step 2: reading SRH.List[SRH.SL] to obtain 32bits-ipv4-bc-uet1, where merely 32 bits are read.

At Step 3: converting 32bits-ipv4-bc-uet1 into end.x-sid-bc-uet1, and then copying into a DA field of an outer IPv6 header. The conversion method may refer to the above description.

At Step 4: searching a routing table to forward a packet to node B according to the DA of the outer IPv6 header.

3) When the packet reaches node B, according to the current DA equal to end.x-sid-bc-uet1, a local SID table entry is hit and gives a UET attribute UET(1), which is updated to SRH.UET. Then, the following main codes are executed in order.

At Step 1: decreasing SRH.SL by 1 to 5.

At Step 2: reading SRH.List[SRH.SL] to obtain 32bits-ipv4-d-uet0, where merely 32 bits are read.

At Step 3: converting 32bits-ipv4-d-uet0 into end-sid-d-uet0, and then copying into a DA field of an outer IPv6 header. The conversion method may refer to the above description.

At Step 4: forwarding the packet along a link corresponding to end.x-sid-bc-uet1.

3) When the packet reaches node D, according to the current DA equal to end-sid-d-uet0, a local SID table entry is hit and gives a UET attribute UET(0), which is updated to SRH.UET, namely, the compression domain is to be converted into a conventional classical SRv6 domain. Node D firstly restores SRH.SL to a count in units of the classical 128-bit SRv6 SID, i.e., SRH.SL=SRH.SL/4, resulting in SRH.SL=1. Then, the following main codes are executed in order.

At Step 1: decreasing SRH.SL by 1 to 0.

At Step 2: reading SRH.List[SRH.SL] to obtain end.dt6-sid-d-uet0, where 128 bits are read.

At Step 3: copying end.dt6-sid-d-uet0 into the DA field of the outer IPv6 header.

At Step 4: searching, according to the DA of the outer IPv6 header, a routing table to forward the packet which will hit a local SID table entry, and removing the outer IPv6 header and SRH to further process an inner IPv6 load.

Specific Embodiment II

This embodiment describes a compression scheme where the entire SRv6 domain uses pure 32-bit MPLS labels as SIDs. Still in the SRv6 network shown in FIG. 8 in which the ISIS protocol is executed, all nodes are configured to support UET(0) and UET(2), and UET Flag=0b10 is contained in the SRv6 capability information of external flooding. A classical 128-bit SRv6 SID is allocated to each node per SID per UET. For example:

node S allocates an END SID end-sid-s-uet0 for UET(0), and an END SID end-sid-s-uet2 for UET(2).

Other nodes allocate SIDs in a similar manner with similar names.

Suppose that an SR-TE path is established from the head node S to the tail node D, and the segment list of the path is <node A, node B, link B->C, node D>, then the path may be obtained by computation by the head node itself, or by requesting the controller to compute.

When the segment list is to be translated into an SID list, the head node (or controller) will check route nodes passed through by the segment list, and obtain a common compression capability shared by all route nodes. In this example, all the nodes have announced a UET(2) type compression capability to the outside, so the head node (or controller) can use merely MPLS labels in the SID list, that is, the SID list is <s.label-a, a.label-b, b.label-bc, c.label-d>, where s.label-a represents a label allocated locally to prefix-A (such as a loopback route of node A) on node S, a.label-b represents a label allocated locally to prefix-B (such as a loopback route of node B) on node A, b.label-bc represents a label allocated locally to adjacency-BC on node B, and c.label-d represents a label allocated locally to prefix-D (such as a loopback route of node D) on node C.

It should be noted that, although an existing SR-MPLS control plane protocol may be deployed in the SRv6 domain to announce the MPLS label, a simplified label announcement capability may be introduced by directly extending an SRv6 control plane protocol, which is not discussed in the present disclosure.

If there is a VPN service to be carried on the SR-TE path, an SID related to the VPN service is further added to the rooter of the SID list. Assuming that the SID is an END.DT6 type SID, end.dt6-sid-d-uet0, which is allocated by node D and is a classical 128-bit SRv6 SID, then an SID list <s.label-a, a.label-b, b.label-bc, c.label-d, end.dt6-sid-d-uet0> is obtained.

In the SRH for packet encapsulation, the first four SIDs are assembled into a 128-bit basic unit, and the UET flag in the Context Field of each of s.label-a, a.label-b, and b.label-bc is 0b10, while the UET flag in the Context Field of c.label-d is 0b00. SRH.SL has an initial value 2, and SRH.UET is set to 0b10.

Next, the process of forwarding the packet along the SR-TE path is described:

1) The packet is forwarded from the head node S to the logically first segment node, i.e., Node A. Since SRH.UET is 0b10, indicating that the current compression domain is a UET(2) type, where each SID occupies merely 32 bits, Therefore, the value of SRH.SL is increased by a factor of 4 times and updated, i.e., SRH.SL=SRH.SL*4, resulting in SRH.SL=8.

Then, the logically first SID in SRH is obtained, i.e., the following main codes are executed in order.

At Step 1: decreasing SRH.SL by 1 to 7.

At Step 2: reading SRH.List[SRH.SL] to obtain s.label-a., where merely 32 bits are read.

At Step 3: acquiring the UET value 0b10 stored in the Context Field of s.label-a, and updating the UET value 0b10 to SRH.UET.

At Step 4: mapping s.label-a to prefix-A, and then copying into a DA field of an outer IPv6 header.

At Step 5: searching, according to the DA of the outer IPv6 header, a routing table to forward the packet (or directly acquiring forwarding information from an ILM mapping table entry) which is forwarded to node A.

2) When the packet reaches node A, if a local address routing table entry is hit according to the current DA equal to prefix-A, there is no update to SRH.UET. Since SRH.UET is 0b10, the following main codes are executed in order.

At Step 1: decreasing SRH.SL by 1 to 6.

At Step 2: reading SRH.List[SRH.SL] to obtain a.label-b., where merely 32 bits are read.

At Step 3: acquiring the UET value 0b10 stored in the Context Field of a.label-b, and updating the UET value 0b10 to SRH.UET.

At Step 4: mapping a.label-b to prefix-B, and then copying into a DA field of an outer IPv6 header.

At Step 5: searching, according to the DA of the outer IPv6 header, a routing table to forward the packet (or directly acquiring forwarding information from an ILM mapping table entry) which is forwarded to node B.

3) When the packet reaches node B, if a local address routing table entry is hit according to the current DA equal to prefix-B, there is no update to SRH.UET. Since SRH.UET is 0b10, the following main codes are executed in order.

At Step 1: decreasing SRH.SL by 1 to 5.

At Step 2: reading SRH.List[SRH.SL] to obtain b.label-bc., where merely 32 bits are read.

At Step 3: acquiring the UET value 0b10 stored in the Context Field of b.label-bc, and updating the UET value 0b10 to SRH.UET.

At Step 4: mapping b.label-bc into an IPv6 address of a peer interface of adjacency-BC, and then copying into a DA field of an outer IPv6 header.

At Step 5: searching, according to the DA of the outer IPv6 header, a routing table to forward the packet (or directly acquiring forwarding information from an ILM mapping table entry) which is forwarded to node B.

4) When the packet reaches node C, according to the current DA equal to an IPv6 address of a local interface of adjacency-BC, and a local address routing table entry is hit, there is no update to SRH.UET. Since SRH.UET is 0b10, the following main codes are executed in order.

At Step 1: decreasing SRH.SL by 1 to 4.

At Step 2: reading SRH.List[SRH.SL] to obtain c.label-d, merely 32 bits are read.

At Step 3: acquiring the UET value 0b00 stored in the Context Field of c.label-d, and updating the UET value 0b00 to SRH.UET, indicating that after the packet reaches node D, the compression domain is to be converted into a conventional classical SRv6 domain, so node C is desired to pre-restore SRH.SL to a count in units of the classical 128-bit SRv6 SID by dividing SRH.SL by 4 and rounding to update the value of SRH.SL, i.e., SRH.SL=SRH.SL/4, resulting in SRH.SL=1.

At Step 4: mapping c.label-d to prefix-D, and then copying into a DA field of an outer IPv6 header.

At Step 5: searching, according to the DA of the outer IPv6 header, a routing table to forward the packet (or directly acquiring forwarding information from an ILM mapping table entry) which is forwarded to node D.

5) When the packet reaches node D, if a local address routing table entry is hit according to the current DA, there is no update to SRH.UET. Then, SRH is further parsed, and since SRH.UET is 0b00, the next SID is a classical 128-bit SRv6 SID, the following main codes are executed in order.

At Step 1: decreasing SRH.SL by 1 to 0.

At Step 2: reading SRH.List[SRH.SL] to obtain end.dt6-sid-d-uet0, where 128 bits are read.

At Step 3: copying end.dt6-sid-d-uet0 into the DA field of the outer IPv6 header.

At Step 4: searching, according to the DA of the outer IPv6 header, a routing table to forward the packet which will hit a local SID table entry, and removing the outer IPv6 header and SRH to further process an inner IPv6 load.

Specific Embodiment III

Figure 9:
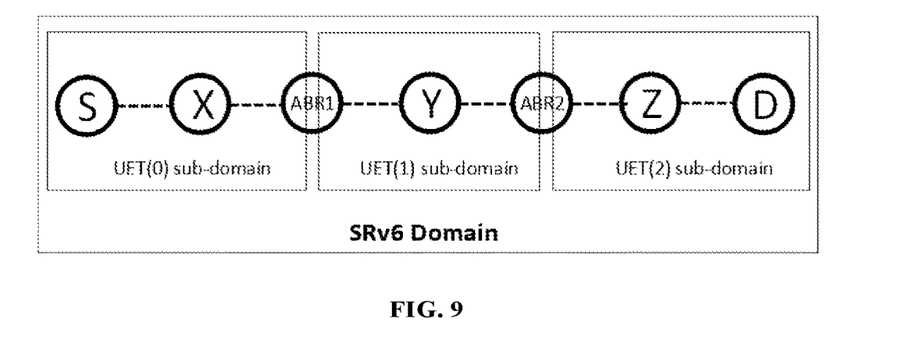
FIG. 9 is a network topology diagram of specific embodiments III of the present disclosure.

This embodiment describes a scenario where the entire SRv6 domain is composed of three different compression domains. The scheme of mixing SIDs of multiple different compression domains has been mentioned in the above technical solution section, and this embodiment mainly considers the case of adjacent UET(1) type and UET(2) type compression domains, where both compression domains use 32-bit SIDs, which can be assembled into a same 128-bit basic unit in SRH. In the network shown in FIG. 9 in which the ISIS protocol is executed, nodes S, X and ABR1 are each configured to support UET(0), nodes ABR1, Y and ABR2 are each configured to support UET(1), and nodes ABR2, Z and D are each configured to support UET(2). Each node includes a corresponding UET flag in the SRv6 capability information of external flooding. A classical 128-bit SRv6 SID is allocated to each node per SID per UET. For example:

node ABR1 allocates an END SID end-sid-abr1-uet0 for UET(0), and an END SID end-sid-abr1-uet1 for UET(1).

Node ABR2 allocates an END SID end-sid-abr2-uet0 for UET(0), an END SID end-sid-abr2-uet1 for UET(1), and an END SID end-sid-abr2-uet2 for UET(2).

Other nodes allocate SIDs in a similar manner with similar names. For naming of a 32-bit IPv4 address in a UET(1) type compressed domain. reference may be made to embodiment I.

In addition, a label abr2.label-z is allocated locally to prefix-Z (such as a loopback route of node Z) on node ABR2, a z.label-d is allocated locally to prefix-D (such as a loopback route of node D) on node Z.

Suppose that an SR-TE path is established from the head node S to the tail node D, and the segment list of the path is <node X, node ABR1, node Y, node ABR2, node Z, node D>, then the path may be obtained by computation by the head node itself, or by requesting the controller to compute.

When the segment list is to be translated into an SID list, the head node (or controller) will check route nodes passed through by the segment list, and obtain a common compression capability shared by all route nodes. In this example, the head node or controller knows that node S/X/ABR1 has the compression capability of UET(0), node ABR1/Y/ABR2 has the compression capability of UET(1), and node ABR2/Z/D has the compression capability of UET(2). Therefore, it may be inferred that node ABR1 is a boundary node between two different compression domains (UET(0) and UET(1)), and node ABR2 is a boundary node between two different compression domains (UET(1) and UET(2)), and further combining the per SID per UET information announced to the outside by each node, this segment list may be finally translated into a SID list (including VPN service-related SIDs) as: <end-sid-x-uet0, end-sid-abr1-uet0, 32bits-ipv4-y-uet1, 32bits-ipv4-abr2-uet2, abr2.label-z, z.label-d, end.dt6-sid-d-uet0>.

In the SRH for packet encapsulation, four SIDs, 32bits-ipv4-y-uet1, 32bits-ipv4-abr2-uet2, abr2.label-z, and z.label-d are assembled into a 128-bit basic unit, and the UET flag in the Context Field of abr2.label-z is 0b10, and the UET flag in the Context Field of z.label-d is 0b00. SRH.SL has an initial value 4, and SRH.UET is set to 0b00.

The process of forwarding the packet along the SR-TE path is similar to that in the previous embodiments, but it should be noted that when the packet enters a UET(1) type compression domain from node ABR1, SRH.SL will be quadrupled, and SRH.UET will be set to 0b01. Thereafter, the next SID in the packet will be read every 32 bits, and in particular at ABR2, the packet will be converted from the UET(1) type compressed domain to a UET(2) type compressed domain, while SRH.SL is still a count in units of per 32-bit SID, except that SRH.UET is simply modified to 0b10. For the packet, until processing of the MPLS label type SIDs on node D is completed, SRH.SL is restored to a count in units of per classical 128-bit SRv6 SID, and then SRH.UET is modified to 0b00 to enter the classical SRv6 SRH processing flow.

Specific Embodiment IV

Figure 10:
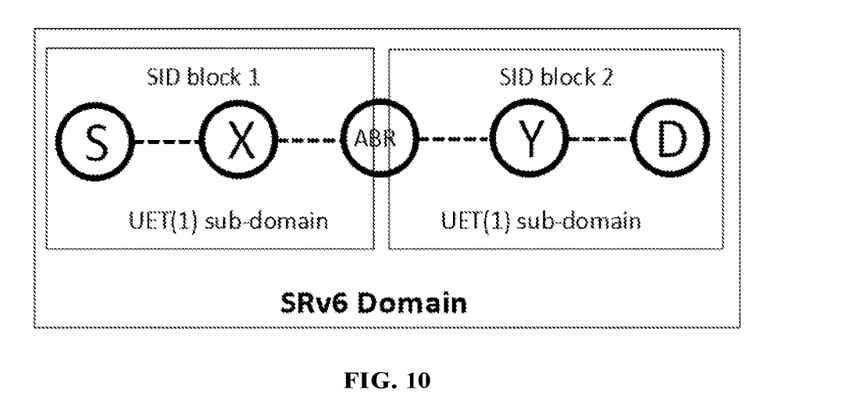
FIG. 10 is a network topology diagram of specific embodiments IV of the present disclosure.

This embodiment is based on embodiment I, and discusses interconnection and interworking between two compressed domains with different SRv6 SID locator blocks and using pure 32-bit IPv4 addresses or values as SIDs. In the SRv6 network shown in FIG. 10 in which the ISIS protocol is executed, all nodes are configured to support UET(0) and UET(1), and UET Flag=0b01 is contained in the SRv6 capability information of external flooding. A classical 128-bit SRv6 SID is allocated to each node per SID per UET, where the SIDs allocated by node S/X/ABR are in a same SRv6 SID locator block block1, and the SIDs allocated by node ABR/Y/D are in a same SRv6 SID locator block block2. For example:

node S allocates an END SID end-sid-block1-s-uet0 for UET(0), and an END SID end-sid-block1-s-uet1 for UET(1), and each of these SID is located in block1.

Node X allocates an END SID end-sid-block1-x-uet0 for UET(0), and an END SID end-sid-block1-x-uet1 for UET(1), and each of these SID is located in block1.

Node ABR allocates an END SID end-sid-block1-abr-uet0 for UET(0), and an END SID end-sid-block1-abr-uet1 for UET(1), and each of these SID is located in block1. Node ABR further allocates an END SID end-sid-block2-abr-uet0 for UET(0), and an END SID end-sid-block2-abr-uet1 for UET(1), and each of these SID is located in block2.

Node further allocates an END SID end-sid-block2-y-uet0 for UET(0), and an END SID end-sid-block2-y-uet1 for UET(1), and each of these SID is located in block2.

Node D allocates an END SID end-sid-block2-d-uet0 for UET(0), and an END SID end-sid-block2-d-uet1 for UET(1), and each of these SID is located in block2.

Suppose that an SR-TE path is established from the head node S to the tail node D, and the segment list of the path is <node X, node ABR, node Y, node D>, then the path may be obtained by computation by the head node itself, or by requesting the controller to compute.

When the segment list is to be translated into an SID list, the head node (or controller) will check route nodes passed through by the segment list (i.e., segments in the segment list), and obtain a common compression capability shared by all nodes. In this example, all the nodes have announced a UET(1) type compression capability to the outside, as well as the SIDs corresponding to UET(1), so the head node (or controller) can use merely SIDs corresponding to UET(1) in the SID list.

It is assumed that in the announcement of all the SIDs described above, it is suggested in the structure information of the SIDs that end-sid-block1-s-uet1, end-sid-block1-x-uet1, and end-sid-block1-abr-uet1 are in a same SRv6 SID locator block, and end-sid-block2-abr-uet1, end-sid-block2-y-uet1, and end-sid-block2-d-uet1 are in a same SRv6 SID locator block, and a length of SRv6 SID locator node+a length of SRv6 SID function+a length of SRv6 SID arguments in the structure information does not exceed 32 bits. For example:

in the structure of end-sid-block1-x-uet1, the higher 32 bits are block1, the following 32 bits are 32bits-ipv4-block1-x-uet1, which is the SRv6 SID locator node+SRv6 SID function information.

Similarly, in the structure of end-sid-block1-abr-uet1, the higher 32 bits are block1, the following 32 bits are 32bits-ipv4-block1-abr-uet1.

In the structure of end-sid-block2-abr-uet1, the higher 32 bits are block2, the following 32 bits are 32bits-ipv4-block2-abr-uet1.

Thereby, when the head node S encapsulates the packet with SRH, a shorter 32-bit IPv4 address or value may be used as an SID, and it is sensed that ABR is a boundary node between two different blocks, i.e., block1 and block2. Therefore, the compressed SID list is <32bits-ipv4-block1-x-uet1, 32bits-ipv4-block1-abr-uet0, end-sid-block2-abr-uet1, 32bits-ipv4-block2-y-uet1, 32bits-ipv4-block2-d-uet1>. In SRH, the first two SIDs are assembled into a 128-bit basic unit, and the rest space is padded with zeros; and the last two SIDs are assembled into a 128-bit basic unit, and the rest space is padded with zeros. SRH.SL has an initial value 3, and SRH.UET is set to 0b01.

Alternatively, the SID list may be optimized to <32bits-ipv4-block1-x-uet0, end-sid-block2-abr-uet1, 32bits-ipv4-block2-y-uet1, 32bits-ipv4-block2-d-uet1>, that is, the compression domain type is switched on node X in advance to avoid inserting two SIDs related to node ABR. Then in SRH, the first SID is assembled into a 128-bit basic unit, and the rest space is padded with zeros; and the last two SIDs are assembled into a 128-bit basic unit, and the rest space is padded with zeros. SRH.SL has an initial value 3, and SRH.UET is set to 0b01.

The specific packet forwarding process is not repeated here.

An embodiment of the present disclosure further provides an electronic device, including:
one or more processors; and
a memory having one or more programs stored thereon which, when executed by the one or more processors, cause the one or more processors to implement the method according to the present disclosure.

The processor is a device with a data processing capability, including but not limited to a central processing unit (CPU) or the like; and the memory is a device with a data storage capability, including but not limited to a random access memory (RAM, more specifically SDRAM, DDR, etc.), a read only memory (ROM), an electrically erasable programmable read only memory (EEPROM) or a flash memory (FLASH).

An embodiment of the present disclosure provides a computer-readable medium having a computer program stored thereon which, when executed by a processor, cause the method according to the present disclosure to be implemented.

Those of ordinary skill in the art will appreciate that all or some operations of the above described method, functional modules/units in the system and apparatus may be implemented as software, firmware, hardware, and suitable combinations thereof. In a hardware implementation, the division between the functional modules/units mentioned in the above description does not necessarily correspond to the division of physical components; for example, one physical component may have multiple functions, or one function or operation may be performed cooperatively by several physical components. Some or all physical components may be implemented as software executed by a processor, such as a CPU, a digital signal processor or microprocessor, or implemented as hardware, or implemented as an integrated circuit, such as an application specific integrated circuit. Such software may be distributed on a computer-readable medium which may include a computer storage medium (or non-transitory medium) and communication medium (or transitory medium). As is well known to those of ordinary skill in the art, the term computer storage medium includes volatile and nonvolatile, removable and non-removable medium implemented in any method or technology for storing information, such as computer-readable instructions, data structures, program modules or other data. A computer storage medium includes, but is not limited to, RAM, ROM, EEPROM, flash memory or other memory technology, CD-ROM, digital versatile disc (DVD) or other optical disc storage, magnetic cartridge, magnetic tape, magnetic disk storage or other magnetic storage devices, or may be any other medium used for storing the desired information and accessible by a computer. Moreover, it is well known to one of ordinary skill in the art that a communication medium typically includes a computer-readable instruction, a data structure, a program module, or other data in a modulated data signal, such as a carrier wave or other transport mechanism, and may include any information delivery medium.

The present disclosure has disclosed example embodiments, and although specific terms are employed, they are used and should be interpreted in a generic and descriptive sense only and not for purposes of limitation. In some instances, features, characteristics and/or elements described in connection with a particular embodiment may be used alone or in combination with features, characteristics and/or elements described in connection with other embodiments, unless expressly stated otherwise, as would be apparent to one skilled in the art. It will, therefore, be understood by those skilled in the art that various changes in form and details may be made therein without departing from the scope of the present disclosure as set forth in the appended claims.

What is claimed is:

1. A packet encapsulation method, comprising:
determining a segment routing-traffic engineering (SR-TE) path;
generating, according to a segment identifier (SID) of each node in the SR-TE path, an SID list, wherein each node supports a plurality of unified-SID encapsulation types (UETs) corresponding to SIDs of different lengths, and in the SID list, a SID of at least a node serving as an intermediate node of the SR-TE path is the SID having the non-longest length in the plurality of SIDs corresponding to the node;
forming a segment routing header (SRH) from the SID list; and
encapsulating an initial packet with the SRH to obtain a final packet,
wherein each SID having the non-longest length in the SID list is a SID compressed from an original SID having the longest length, and
wherein the generating, according to an SID of each node in the SR-TE path, an SID list comprises: carrying, in the SID of at least one intermediate node, a Flag indicating a length of a next SID of the SID of the intermediate node in the SID list.

2. The method according to claim 1, wherein,
the method is applied in an SRv6 network; and
among the different lengths of the SIDs to which the plurality of UETs correspond, the longest length is 128 bits, and the SID having the non-longest length is a 32-bit SID, 16-bit SID, or 8-bit SID.

3. The method according to claim 1,
wherein the forming an SRH from the SID list comprises:
carrying, in the SRH, a Flag indicating a type of the compression domain where the packet is located.

4. An electronic device, comprising:
one or more processors; and
a storage device having one or more programs stored thereon which, when executed by the one or more processors, cause the one or more processors to implement the method according to claim 1.

5. A computer-readable storage medium having a computer program stored thereon which, when executed by a processor, causes the method according to claim 1 to be implemented.

6. A packet forwarding method, comprising:
receiving a final packet sent from a previous node, and parsing the final packet to obtain a SID list of nodes in an SR-TE path, wherein the final packet is a final packet obtained by the encapsulation method according to claim 1; and
forwarding the final packet to a next hop node according to the SID list.

7. The method of claim 6, wherein
the forwarding the final packet to a next hop node according to the SID list comprises:
determining, according to a Flag which is carried in an SID of the current node in the SID list and indicates a compression type of a next SID in the SID list, whether the next SID is an compressed SID and its compression type;
restoring, in response to determining that the next SID is an compressed SID and its compression type, the next SID to an uncompressed SID in the SID list; and
forwarding the final packet to the next hop node according to the uncompressed SID, an address of the next SID being the uncompressed SID.

8. The method of claim 7, wherein,
the SID list contains a plurality of basic units each having a same length;
each uncompressed SID in the SID list is placed in a respective basic unit, and at least two adjacent compressed SIDs in the SID list are assembled together in another basic unit;
the SRH further comprises a Segment Left (SRH.SL) field; and
after determining whether the next SID is an compressed SID and its compression type, the method further comprises:
in respond to determining that the SID of the current node in the SID list is an uncompressed SID and the next SID is a compressed SID, increasing the value of the SRH.SL field by N times, and
in respond to determining that the SID of the current node in the SID list is an compressed SID and the next SID is an uncompressed SID,
decreasing the value of the SRH. SL field by N times,
wherein N indicates how many times a length of the uncompressed SID is greater than a length of the compressed SID, N being an integer greater than 1.

9. An electronic device, comprising:
one or more processors; and
a storage device having one or more programs stored thereon which, when executed by the one or more processors, cause the one or more processors to implement the method according to claim 6.

10. A computer-readable storage medium having a computer program stored thereon which, when executed by a processor, causes the method according to claim 6 to be implemented.

* * * * *